(12) United States Patent
Parks

(10) Patent No.: US 6,838,787 B2
(45) Date of Patent: Jan. 4, 2005

(54) VARIABLE BANDWIDTH CORRELATED DOUBLING SAMPLING CIRCUITS FOR IMAGE SENSORS

(75) Inventor: Christopher Parks, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 345 days.

(21) Appl. No.: 10/050,755

(22) Filed: Jan. 16, 2002

(65) Prior Publication Data

US 2003/0132670 A1 Jul. 17, 2003

(51) Int. Cl.$^7$ ................................................ H02M 3/06
(52) U.S. Cl. ....................... 307/109; 257/291; 348/241; 348/243
(58) Field of Search ......................... 307/125; 327/381, 327/94, 96

(56) References Cited

U.S. PATENT DOCUMENTS

| | | | | |
|---|---|---|---|---|
| 4,987,321 A | | 1/1991 | Toohey | 307/520 |
| 5,554,944 A | * | 9/1996 | Van Buul et al. | 327/91 |
| 5,698,999 A | * | 12/1997 | Etoh et al. | 327/94 |
| 5,949,483 A | * | 9/1999 | Fossum et al. | 348/303 |
| 5,955,903 A | * | 9/1999 | Pham | 327/132 |
| 6,184,726 B1 | * | 2/2001 | Haeberli et al. | 327/96 |
| 6,252,536 B1 | * | 6/2001 | Johnson et al. | 341/155 |
| 6,346,968 B1 | * | 2/2002 | Domer et al. | 348/223.1 |
| 6,366,320 B1 | * | 4/2002 | Nair et al. | 348/300 |
| 6,529,237 B1 | * | 3/2003 | Tsay et al. | 348/241 |
| 6,583,416 B1 | * | 6/2003 | Villani | 250/332 |
| 6,584,305 B1 | * | 6/2003 | Ohta et al. | 455/307 |
| 6,617,567 B2 | * | 9/2003 | Mukherjee et al. | 250/214 A |
| 6,670,598 B1 | * | 12/2003 | Hosier et al. | 250/214 A |
| 6,686,957 B1 | * | 2/2004 | Johnson et al. | 348/222.1 |

* cited by examiner

Primary Examiner—Robert L. DeBeradinis
(74) Attorney, Agent, or Firm—Peyton C. Watkins

(57) ABSTRACT

An integrated circuit for sampling outputs representing a pixel value comprises two first variable capacitors each having a variable range of capacitance and each for receiving the voltage representing the pixel value; two first transistors respectively connected electrically to each of the first variable capacitors for transferring the voltage to each of the variable capacitors; and a second transistor connected electrically to each of the first variable capacitors for transferring the voltage from each of the first variable capacitors.

6 Claims, 3 Drawing Sheets

VARIABLE BANDWIDTH CORRELATED DOUBLING SAMPLING CIRCUITS FOR IMAGE SENSORS

FIELD OF THE INVENTION

The invention relates generally to the field of double correlated sampling circuits for image sensors and, more particularly, to such double sampling circuits having programmable capacitance for permitting real-time control of the bandwidth and its associated noise.

BACKGROUND OF TEE INVENTION

As shown in FIGS. 1 and 2 and as disclosed in U.S. Pat. No. 4,987,321, prior art correlated double sampling (CDS) circuits for image sensors 10 include capacitors 20 for storing charge from the image sensors 10 for subsequent measurement. In this regard, at time $T_A$ pulse $S_A$ turns on transistor 30a to charge capacitor 20a to voltage $V_A$. At time $T_B$, pulse $S_B$ turns on transistor 30b to charge to charge capacitor 20c to voltage $V_B$. Capacitors 20a and 20c function to hold the sampled voltages $V_A$ and $V_B$ for the duration of one entire pixel period. At time $T_C$, pulse $S_C$ turns on two transistors 30c and 30d to transfer the sampled voltages on capacitors 20a and 20c to capacitors 20b and 20d respectively. A differential amplifier 40 samples the voltages from the capacitors 20b and 20d for subtracting the two received voltages for ultimately determining the voltage for that particular pixel.

Although the currently known and utilized double sampling circuit is satisfactory, it includes drawbacks. The prior art CDS is capable of operation at only one pixel frequency. If the frequency is increased, the sampling pulses $S_A$, $S_B$ and $S_C$ would be too short to fully charge the capacitors 20a through 20d. If the frequency is decreased, the CDS will function but the noise performance will remain the same as though the CDS is operated at its rated frequency.

Consequently, a need exists for a CDS that permits the CDS noise performance to be optimized for more than one frequency.

SUMMARY OF THE INVENTION

The present invention is directed to overcoming one or more of the problems set forth above. Briefly summarized, according to one aspect of the present invention, the present invention resides in an integrated circuit for sampling outputs representing a pixel value comprising: (a) two first variable capacitors each having a variable range of capacitance and each for receiving a voltage representing the pixel value; (b) two first transistors respectively connected electrically to each of the first variable capacitors for transferring the voltage to each of the variable capacitors; and (c) a second transistor connected electrically to each of the first variable capacitors for transferring the voltage from each of the first variable capacitors.

These and other aspects, objects, features and advantages of the present invention will be more clearly understood and appreciated from a review of the following detailed description of the preferred embodiments and appended claims, and by reference to the accompanying drawings.

Advantageous Effect of the Invention

The present invention has the advantage of a CDS that permits the CDS noise performance to be optimized for more than one frequency.

DETAILED DESCRIPTION OF THE INVENTION

Figure 1:
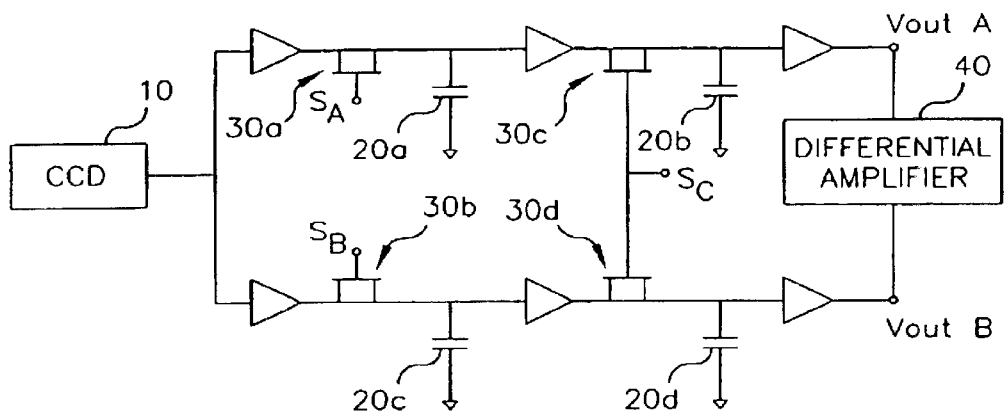
FIG. 1 is a schematic diagram of a prior art CDS.
Figure 2:
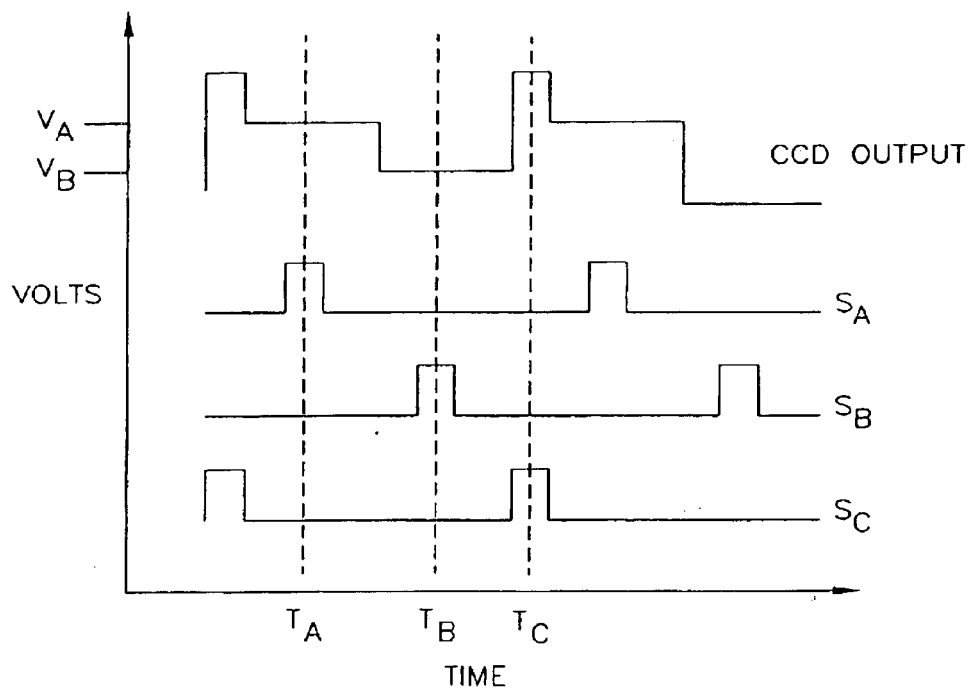
FIG. 2 is a timing diagram for FIG. 1.
Figure 3:
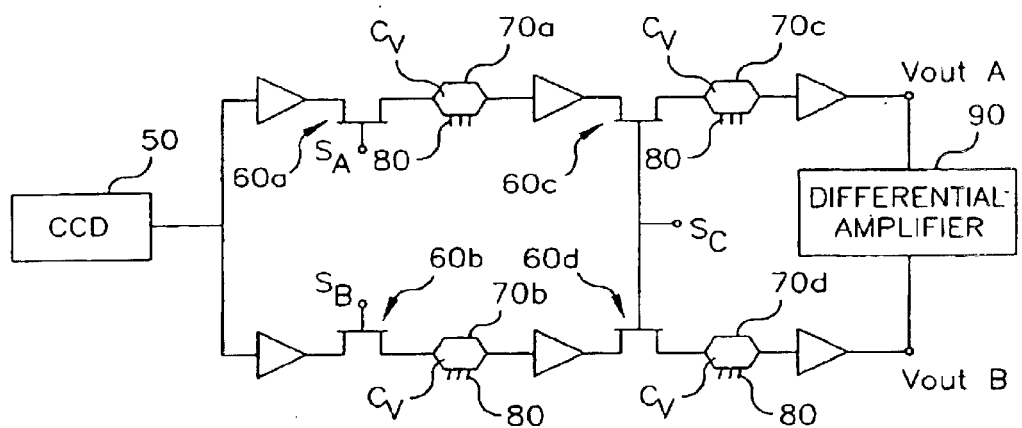
FIG. 3 is a schematic diagram of a CDS of the present invention.
Figure 4:
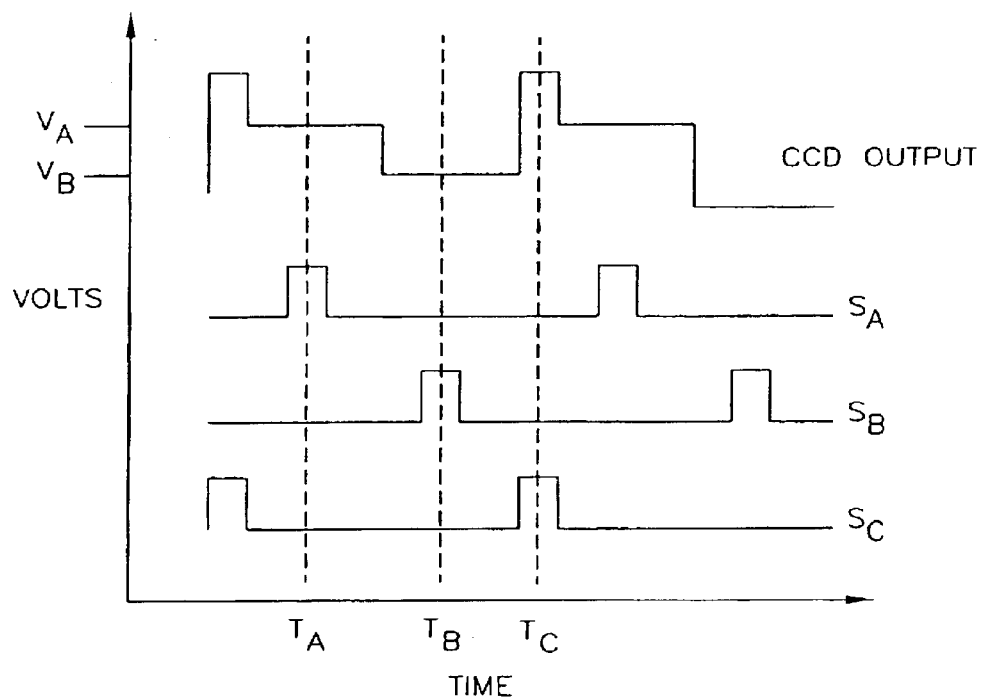
FIG. 4 is a timing diagram for FIG. 3.

Referring to FIGS. 3 and 4, there is shown a schematic diagram of the present invention having a charge-coupled device 50 for collecting incident light that is converted into a charge. A pair of transistors 60a and 60b is electrically connected to the output amplifier of the CCD 50 for transferring voltage from the CCD output amplifier 50. In this regard, at time $T_A$ pulse $S_A$ turns on transistor 60a to charge variable capacitor 70a to voltage $V_A$. At time $T_B$, pulse $S_B$ turns on transistor 60b to charge variable capacitor 70b to voltage $V_B$. Variable capacitors 70a and 70b function to hold the sampled voltages $V_A$ and $V_B$ for the duration of one entire pixel period. The variable capacitors 70a and 70b include inputs 80 for receiving signals for altering the capacitance, as described in detail hereinbelow. At time $T_C$, pulse $S_C$ turns on two transistors 60c and 60d to transfer the sampled voltages on variable capacitors 70a and 70b to variable capacitors 70a and 70d respectively, which capacitors also include inputs 80 for altering the capacitance. A differential amplifier 90 samples the voltages from the capacitors 70c and 70d for subtracting the two received voltages for ultimately determining the voltage for that particular pixel.

Figure 5:
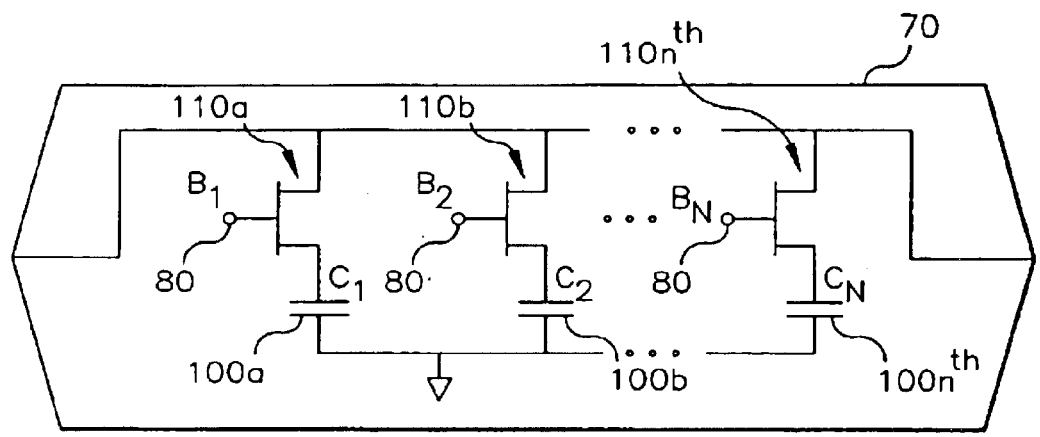
FIG. 5 is an embodiment of the present invention for implementing a variable capacitor of FIG. 4.

Referring to FIG. 5, there is shown one embodiment for implementing the variable capacitors 70a–70d. In this regard, the variable capacitor 70 includes a plurality of individual capacitors 100 that mated with individual transistors 110. The individual capacitors 100 are charged when their mated transistor 110 receives a signal via the input line 80. Upon receipt of this signal, the charge is collected by the mated capacitor 100. The input signals 80 are directed by the user for changing the capacitance to the desired level. The number of mated pairs of transistors 110 and capacitors 100 are determined by the user based on the maximum capacitance desired. It is to be noted that the capacitors 100 are independent of each other and may activated in any desired array, contiguous or non-contiguous.

Figure 6:
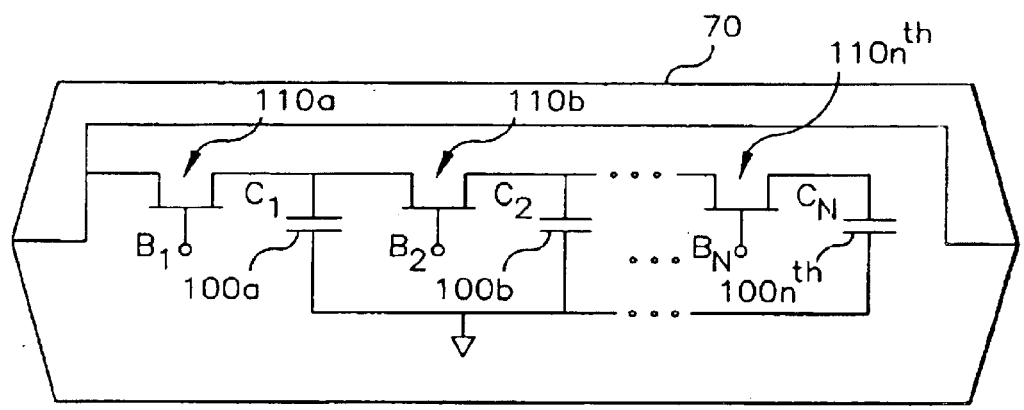
FIG. 6 is an alternative embodiment of FIG. 5.

Referring to FIG. 6, there is shown an alternative embodiment for implementing a variable capacitor 70. In this embodiment, there are also mated pairs of transistors 110 and capacitors 100. However, it is to be noted that the mated pairs 100 and 100 are connected serially so that they must be activated sequentially from capacitor 10a to capacitor 100$n^{th}$.

The invention has been described with reference to a preferred embodiment. However, it will be appreciated that variations and modifications can be effected by a person of ordinary skill in the art without departing from the scope of the invention.

Parts List 10 image sensor
20 capacitors
30 transistors
40 differential amplifier
50 image sensor
60 transistor 70 variable capacitor
80 variable capacitor inputs
90 differential amplifier
100 capacitors
110 transistors

What is claimed is:

1. An integrated circuit for sampling outputs representing a pixel value comprising:
    (a) two first variable capacitors each having a variable range of capacitance and each for receiving a voltage representing the pixel value;
    (b) two first transistors respectively connected electrically to each of the first variable capacitors for transferring a voltage to each of the variable capacitors; and
    (c) two second transistors respectively connected electrically to each of the first variable capacitors for transferring the voltage from each of the first variable capacitors for permitting control of the bandwith.

2. The integrated circuit as in claim 1 further comprising two second capacitors each having a variable range and respectively connected electrically to the first variable capacitors for receiving voltage from the first variable capacitors when the second transistor is pulsed.

3. The integrated circuit as in claim 2 further comprising a differential amplifier for receiving the voltage from the two second capacitors for determining a resultant absolute voltage.

4. An integrated circuit for collecting incident light that is converted into a charge and for sampling the charge, the integrated circuit comprising:
    (a) an image sensor for receiving the incident light which is converted into the charge;
    (b) two first variable capacitors each having a variable range of capacitance and each for receiving a voltage from the image sensor;
    (c) two first transistors respectively connected electrically to each of the first variable capacitors for pulsing the voltages to each of the first variable capacitors; and
    (d) two second transistors respectfully connected electrically to each of the first variable capacitors for pulsing the voltage from each of the first variable capacitors for permitting control of the bandwith.

5. The integrated circuit as in claim 4 further comprising two second capacitors each having a variable range and respectively connected electrically to the first variable capacitors for receiving the voltage from the first variable capacitors when the second transistor is pulsed.

6. The integrated circuit as in claim 5 further comprising a differential amplifier for receiving the voltage from the two second capacitors for determining a resultant absolute voltage.

* * * * *